United States Patent
Voss

[11] Patent Number: 5,360,088
[45] Date of Patent: Nov. 1, 1994

[54] METHOD OF MANUFACTURING A BICYCLE BRAKE BLOCK AND THE BLOCK

[76] Inventor: Darrell W. Voss, 577 NE. Jefferson #2, Chehelis, Wash. 98532

[21] Appl. No.: 745,351

[22] Filed: Aug. 15, 1991

[51] Int. Cl.$^5$ .............................................. F16D 69/00
[52] U.S. Cl. ................... 188/250 B; 264/268; 425/127
[58] Field of Search ................... 188/73.1, 73.2, 250 B, 188/254; 425/127; 264/268

[56] References Cited

U.S. PATENT DOCUMENTS

| | | | |
|---|---|---|---|
| 1,557,668 | 10/1925 | France | 188/254 |
| 3,840,093 | 10/1974 | Hamayasu | 188/73.1 X |
| 3,958,910 | 5/1976 | Wilde | 425/127 |
| 4,159,298 | 6/1929 | Bainard | 264/268 X |
| 5,064,027 | 11/1991 | Akamatsu | 188/250 B X |

FOREIGN PATENT DOCUMENTS

| | | | |
|---|---|---|---|
| 448016 | 1/1913 | France | 188/24.12 |
| 1470785 | 1/1967 | France | 188/254 |
| 2405175 | 6/1979 | France | 188/250 B |
| 2008279 | 3/1971 | Germany | 188/250 B |
| 606858 | 11/1978 | Switzerland | 188/73.1 |

Primary Examiner—Robert J. Oberleitner
Attorney, Agent, or Firm—Jim Zegeer

[57] ABSTRACT

The subject brake block comprises a cup shaped metal component and an elastomeric component formed in a two part mold. The method involves using the metal component of each brake block as one of the parts used in molding the elastomeric component of the brake block. This decreases the accuracy required in making and aligning the mold parts. The metal component is shaped so that the elastomeric component is mechanically locked in place in it when the elastomeric component is formed.

1 Claim, 1 Drawing Sheet

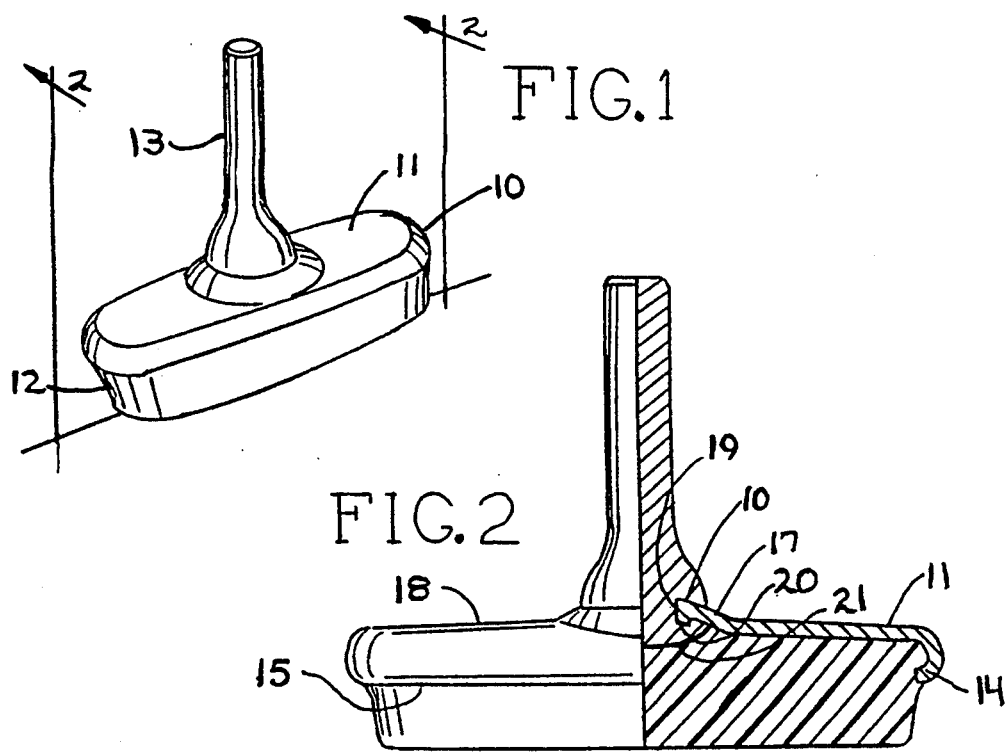
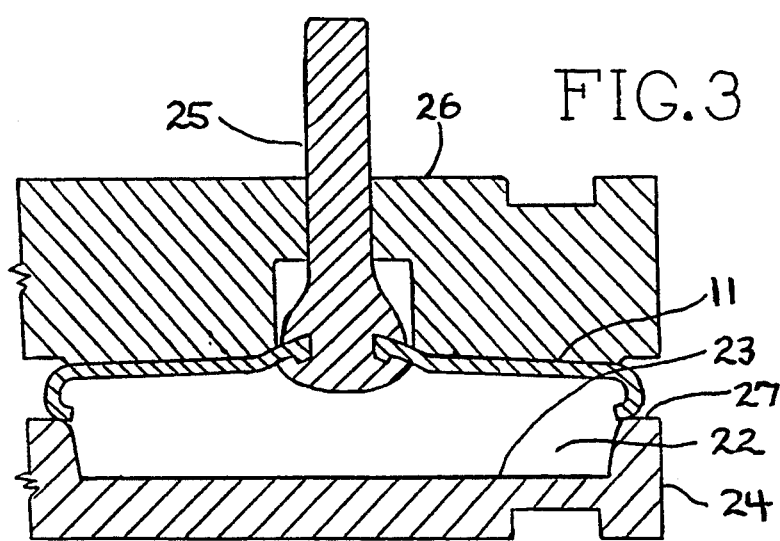

METHOD OF MANUFACTURING A BICYCLE BRAKE BLOCK AND THE BLOCK

BACKGROUND OF THE INVENTION

1. Field

The subject invention is in the field of processes for manufacturing small articles and assemblies and the articles produced. In particular it is in the field of processes for manufacturing small assemblies which comprise metal and elastomeric components and, more particularly, manufacturing bicycle brake blocks and the blocks. Such blocks are assemblies which each comprise a metal stud, for mounting the block, a metal stiffener, referred to as the skeleton, and an elastomeric component.

2. Prior Art

There are two basic types of commercially available bicycle brake blocks, each type being characterized by the process used in its manufacture. In one type the molded elastomeric component is shaped to fit into the metal component and is held in place by an adhesive and/or by further forming of the metal component. In the second type the elastomeric component is molded in place around the metal component. In both types the elastomeric component is molded in a two part mold, the parts of which must be made very accurately and used in very accurate machinery in order to produce components which are smooth and even at the parting line and do not require removal of flashing, i.e. material which extrudes into any cavity or space between the mold parts.

Achieving the necessary and desired accuracy is relatively expensive and, if the components are not accurately molded, removing the flashing produced with inaccurate parts is prohibitively expensive. The primary objective of the subject invention is to provide a method for less expensive manufacturing of bicycle brake blocks. The blocks produced by such a method have specific design features which result from the use of the method.

SUMMARY OF THE INVENTION

The subject invention is a method for making bicycle brake blocks and the block produced by the method. Bicycle brake blocks comprise metal stiffening and attachment components and a molded elastomeric component. The elastomeric part is made in a two part mold and the fundamental feature of the subject method is that the metal stiffening component is used as one of the mold parts for each elastomeric component. With this method the parting line of the mold parts and the molded part is at the juncture of the metal and elastomeric components on the exterior surface of the assembly. This juncture lies in a flat plane so that elimination of flash requires only that the contacting surfaces of the mold parts (the metal component being one) be flat. Requirements for other accurate alignments between the mold parts are considerably less than in conventional two part molds because there is no visual exposure of the parting line of the molded part. This reduction in accuracy requirements makes the tooling used in the subject method considerably less expensive than conventional tooling.

To describe the tooling and brake block in more detail, the metal component is an elongated shallow cup with an endless rim having an inwardly curled lip. The plane of the outside edge of the inward turned lip is flat. The stud is cold-headed into a hole in the closed face (bottom) of the cup. Each cup is one part of the mold for the elastomeric component which will be part of the block and is held in tooling with its open face facing and aligned with a cavity in the other part of the mold. The elastomeric component in its unvulcanized state is held in the mold formed by the cup and cavity and when the vulcanizing is complete, the brake block is complete. The molding may be single or multiple cavity.

The invention is described in more detail below with reference to the attached drawings.

DETAILED DESCRIPTION OF THE DRAWINGS

FIG. 1 is a perspective view of a brake block (assembly) made using the subject method.

FIG. 2 is a sectional view taken at 2—2 in FIG. 1.

FIG. 3 is a sectional view of the tooling used in molding the elastomeric component of the brake block, the view being in a plane through the axes of the brake block studs.

DETAILED DESCRIPTION OF THE INVENTION

The subject invention is a method of manufacturing a bicycle brake block and the block made according to the method. The brake block 10 is shown in perspective in FIG. 1 and is an assembly comprising metal component 11, elastomeric component 12 and mounting stud 13.

FIG. 2 is a sectional view of the assembly taken at 2—2 in FIG. 1. Component 11 is metal and has an elongated, shallow cup shape with an endless inwardly curved lip 14 around rim 15 which lies in a flat plane. The stud has a shoulder 16 which is contoured to fit closely onto a spherical shaped segment 17 of component base 18. Hole 19 in the base is formed with a lip 20 and stub 21 of the stud is cold headed as shown to fasten the stud securely to the metal component. The elastomeric component is securely held in place by mechanical engagement with endless, inwardly curved lip 14 and is formed in place according to a method described here with reference to FIG. 3, a sectional view of the tooling used in the method. Cavity 22 is formed by metal component 11 and indentation 23 in die 24. The planiform surface of the opening of the cup shaped metal component and the cavity in the die match. The metal component/stud assembly 25 is held in tooling part 26 and part 26 and die 24 are held in position relative to each other as shown by structural mechanism well known in the art. The cavity is filled with uncured elastomer either in the form of a preformed uncured part or by injection using appropriate inlet and vent passages in the die. All the tooling and parts are then processed to cure the elastomer. The completed brake block assembly is then removed from the tooling part and die and is ready for use. The close contact between the metal component rim and surface 27 of the die prevent formation of flashing without the need for accurate relative positioning of the metal component and die except that the rim and surface 27 be flat and in complete contact.

The method comprises the steps of:
 1. providing a cup shaped metal component having an inwardly curved lip and a flat rim, said lip having a first planiform surface;

2. providing a die having a cavity set into a flat surface to said cavity having a second planiform surface matching said first planiform;
3. providing tooling to hold the rim of the metal component against the flat surface of the die with the planiform surface of the metal component positioned to match the planiform surface of the cavity;
4. filling the space formed by the cup and cavity with uncured elastomer, and
5. curing the elastomer.

The tooling and die may be such that more than one brake block can be processed at one time. The elastomer may be introduced into the cup and cavity as a preformed uncured part or may be injected using appropriate inlet and vent passages in the die.

It is considered to be understandable from this description that the subject invention meets its objectives. The accuracy required in the tool and die components to avoid mismatching in the molded part and to also avoid flashing is considerably less than that required in conventional methods and therefore the manufacturing of the brake blocks and the brake blocks manufactured are less expensive.

It is also considered to be understandable that while one method of manufacture and one embodiment of the manufactured brake block are described herein, variations of the method and other embodiments of the manufactured block or modifications of the embodiment described are possible within the scope of the invention which is limited only by the attached claims.

I claim:
1. A method for manufacturing a bicycle brake block, comprising the steps of:
   a. providing an elongated shaped metal cup having a base, a endless rim and an inwardly curved endless lip, said curved endless lip having a first planiform surface,
   b. providing a die having a cavity set into a flat surface, said cavity having a second planiform surface matching said first planiform surface,
   c. providing tooling to hold said curved lip of said metal component against said flat surface with said first planiform matching said second planiform surface,
   d. completely filling said cup-shaped component and said cavity with uncured elastomer, and
   e. curing the elastomer.

* * * * *